No. 818,099. PATENTED APR. 17, 1906.
O. M. KNOX.
CULINARY VESSEL.
APPLICATION FILED AUG. 2, 1905.

Witnesses
Geo. Ackman Jr.
Frank B. Hoffman.

Inventor
Orville M. Knox,
By C. C. Hines,
Attorney

UNITED STATES PATENT OFFICE.

ORVILLE MARSHALL KNOX, OF ONEIDA, NEW YORK.

CULINARY VESSEL.

No. 818,099.

Specification of Letters Patent.

Patented April 17, 1906.

Application filed August 2, 1905. Serial No. 272,344.

*To all whom it may concern:*

Be it known that I, ORVILLE MARSHALL KNOX, a citizen of the United States, residing at Oneida, in the county of Madison and State of New York, have invented certain new and useful Improvements in Culinary Vessels, of which the following is a specification.

This invention relates to culinary vessels of the boiler class, and especially to improvements in the type of vessel shown in my prior United States patent, No. 795,287, dated July 25, 1905, wherein the vessel is composed of an inner vessel section and an outer jacket spaced to form an inclosed heating-chamber surrounding the inner vessel section, thereby presenting an extended surface to the action of the flame or other heating medium.

The present invention has for its object to provide a vessel of this type which is so constructed as to secure both a further increased area of heating-surface and economy of manufacture and also to provide a rigid, strong, and durable mode of connecting the elements of the vessel together, thereby enabling braces to be dispensed with, particularly in small vessels.

With these and other objects in view the invention consists of the novel construction and combination of parts hereinafter fully described and claimed, reference being had to the accompanying drawings, in which—

Figure 1:
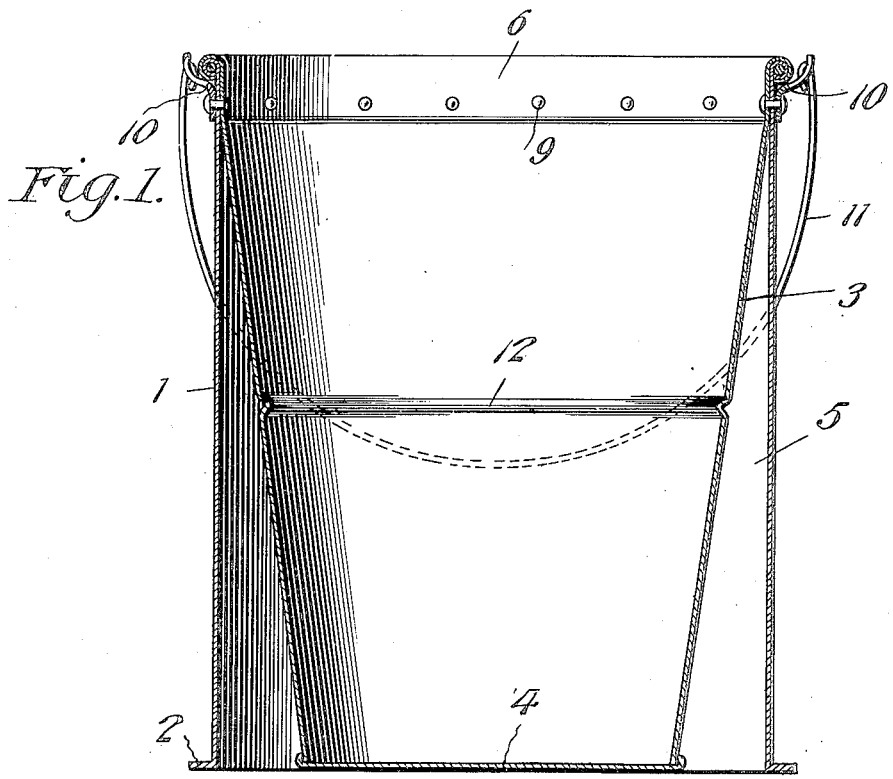
Figure 2:
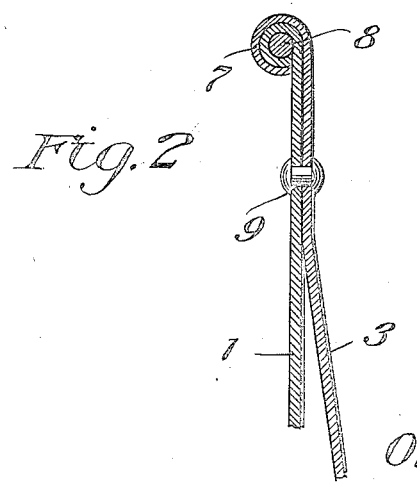

Figure 1 is a vertical longitudinal section taken centrally through a vessel embodying the invention; and Fig. 2 is a similar view, on an enlarged scale, through the upper end of the vessel, showing the construction of the joint between the elements thereof.

Referring to the drawings, 1 designates an outer open-ended jacket or casing of tubular form composed of sheet metal or other appropriate material and having at its lower end an outturned base-flange 2. Disposed within said jacket or casing is a tapering or flaring inner vessel member or section 3, which is coextensive in length or depth therewith and is preferably formed with downwardly-tapered side walls. The said inner vessel section 3 is of frusto-conical form, being widest and open at its upper end and narrowest and closed at its lower end, the latter being provided with a bottom 4, arranged in a plane common with that of the base-flange 2 of the jacket. The walls of the inner vessel section are spaced from the walls of the jacket throughout nearly the entire depth of the vessel, thus forming an interposed gradually upwardly contracted heating-chamber 5.

The upper end of the flaring body of the inner vessel section 3 is approximately of the same internal diameter as the jacket 1 and terminates in a cylindrical flange 6, which lies parallel with and against the upper end of the wall of the jacket 1, and the edges of this flange and the wall of the jacket are turned outwardly upon one another to form an annular bead or rim 7, inclosing a stiffening element 8, preferably formed of stout wire, this construction connecting the upper ends of the two vessel members in a strong and durable manner. In order to strengthen and increase the stability of the connection, the flange 6 is further connected with the wall of the jacket 1 by an annular series of rivets 9, thereby firmly joining the parts in such manner that disconnection cannot possibly occur, while the inner vessel section 3 will be strongly supported, and as the bottom 4 of said vessel and the base-flange 2 of the jacket stand in the same plane the weight of the contents of the section 3 will be mutually sustained by the two vessel members and prevented from being thrown upon the elements of the connecting-joint. Two of the rivets 9 at diametrically opposite sides of the vessel may be employed to also fasten ears 10 thereto for the attachment of a pivoted bail or handle 11. The inner vessel section may be formed or provided with a rib or bead 12 to support a steamer or steamer-bottom therein, whereby the efficiency of the vessel is increased.

In practice when the utensil is seated upon a stove the flame or other heating medium will pass into the inclosed chamber around the vessel section 3 for action upon the bottom and sides of the latter, which thus presents an extended surface to the action of the heat and insures rapid heating of the contents of the vessel and an economizing of fuel, it being apparent that owing to the vessel 3 being inclosed by and spaced from the jacket radiation of heat from said vessel will be measurably retarded, thus preventing waste of heat. Further, it will be apparent that the described construction not only increases the area of the heating-chamber 5 to a maximum extent, but enables the jacket and inner vessel section to be produced and combined in an economical manner, thus cheapening the cost of construction. Another advantage obtained by the mode of joining the parts is that the vessel is rendered strong and durable enough to dispense with the use of braces, particularly when made of small size.

Having thus described the invention, what is claimed as new is—

1. A cooking utensil comprising an inner vessel and an outer jacket surrounding the same and spaced therefrom to form an intervening chamber, said vessel and jacket being coextensive in length or depth and having their bottom portions arranged in a common plane, the inner vessel being of frusto-conical and the outer vessel of cylindrical form, the enlarged upper end of the vessel being substantially of the same diameter as the internal diameter of the jacket and terminating in a cylindrical flange snugly fitting against the jacket and closing the upper contracted end of the chamber, the upper edges of the flange and jacket being complementarily outturned to form a rim, a stiffening member inclosed by said rim, and rivets passing through the jacket and flange below the rim and adjacent to the upper end of the flaring body of the vessel and tightly closing the joint formed thereby.

2. A cooking utensil of the character described, comprising an inner vessel of frusto-conical form and having a flat bottom, and an outer jacket of cylindrical form and provided with a base-support disposed in the plane of said flat bottom, the said inner vessel being arranged within the jacket to form an intervening flaring heating-chamber and having its upper end conforming substantially to the internal diameter of the jacket and formed with a cylindrical flange resting in direct contact with the inner surface of the upper end of the jacket and forming a closure for the upper contracted end of the heating-chamber, the upper edges of the jacket and flange being complementarily outturned to form an external rim at the upper end of the vessel, a stiffening element inclosed by said rim, and an annular row of rivets joining the jacket and flange below the rim and between the same and the upper end of the body of the inner vessel and forming a reinforcing attaching and joint-closing connection, substantially as described.

In testimony whereof I affix my signature in presence of two witnesses.

ORVILLE MARSHALL KNOX.

Witnesses:
CHARLES R. COVILLE,
CHARLES H. PERRY.